US007215951B2

(12) United States Patent
Tanaka et al.

(10) Patent No.: US 7,215,951 B2
(45) Date of Patent: May 8, 2007

(54) TEST SYSTEM FOR MOBILE COMMUNICATION TERMINAL IN WHICH STATE OF PROGRESS OF CONNECTION-TRANSITION TEST CAN BE VISUALLY RECOGNIZED

(75) Inventors: Hideki Tanaka, Kanagawa-ken (JP); Ryu Morita, Atsugi (JP); Toshio Inui, Atsugi (JP)

(73) Assignee: Amritsu Corporation, Tokyo (JP)

( * ) Notice: Subject to any disclaimer, the term of this patent is extended or adjusted under 35 U.S.C. 154(b) by 433 days.

(21) Appl. No.: 10/802,680

(22) Filed: Mar. 16, 2004

(65) Prior Publication Data

US 2004/0192214 A1 Sep. 30, 2004

(30) Foreign Application Priority Data

Mar. 24, 2003 (JP) ............................. 2003-081442

(51) Int. Cl.
*H04Q 7/20* (2006.01)
*H04B 17/00* (2006.01)
*H04M 1/24* (2006.01)
(52) U.S. Cl. ............... 455/423; 455/67.11; 455/115.1; 455/115.2; 455/115.4; 455/226.1; 455/226.4; 379/1.01; 379/1.03; 379/1.04
(58) Field of Classification Search ............... 455/423, 455/67.11; 379/1.01
See application file for complete search history.

(56) References Cited

U.S. PATENT DOCUMENTS

| 5,901,364 | A | 5/1999 | Zetterbald |
| 6,011,830 | A | 1/2000 | Sasin et al. |
| 6,061,393 | A | 5/2000 | Tsui et al. |

(Continued)

FOREIGN PATENT DOCUMENTS

DE 41 24 617 A1 1/1993

(Continued)

OTHER PUBLICATIONS

3$^{RD}$ Generation Partnership Project; Technical Specification Group Terminals; Terminal conformance specification; Radio transmission and reception (FDD) (Release 1999) 3GPP TS 34.121 V3. 11.0 (Dec. 2002).

(Continued)

*Primary Examiner*—Joseph Feild
*Assistant Examiner*—S. Smith
(74) *Attorney, Agent, or Firm*—Frishauf, Holtz, Goodman & Chick, P.C.

(57) ABSTRACT

A test procedure control unit outputs control information including time setting information along a procedure for carrying out a transition test of a connection state of a mobile communication terminal (UE) of a cellular system. A transmitting/receiving unit transmits test signals corresponding to cells toward the UE in accordance with the control information, and receives a response signal from the UE. A reception measurement unit measures a transition time of the connection state among the cells of the UE, in accordance with the response signal. A deciding unit receives a measured result of the transition time, and decides whether or not the connection state of the UE is transiting in accordance with the scheduled time-passage. The indicating unit causes the display unit to indicate, the decided result transition among the cells in accordance with the time-passage, so as to be visually recognizable on a single coordinate.

26 Claims, 6 Drawing Sheets

U.S. PATENT DOCUMENTS

| | | |
|---|---|---|
| 6,308,064 B1 | 10/2001 | Green |
| 6,724,730 B1 | 4/2004 | Milinarsky et al. |
| 6,785,540 B1 | 8/2004 | Wichelman |
| 6,804,512 B1 | 10/2004 | Baker et al. |
| 2002/0183054 A1 | 12/2002 | Rimoni et al. |
| 2003/0012257 A1 | 1/2003 | Challa et al. |
| 2003/0045281 A1 | 3/2003 | Rimoni |
| 2003/0193992 A1 | 10/2003 | Challa et al. |
| 2004/0192289 A1 | 9/2004 | Tanaka |
| 2005/0037761 A1 | 2/2005 | Baker et al. |

FOREIGN PATENT DOCUMENTS

| | | |
|---|---|---|
| DE | 100 40 445 C1 | 3/2002 |
| EP | 0 558 465 A2 | 9/1993 |
| WO | WO 00/31895 A | 6/2000 |
| WO | WO 01/41485 A1 | 6/2001 |

OTHER PUBLICATIONS

U.S. Related Application Serial No.: Unassigned, filed Mar. 16, 2004 Inventors: Hideki Tanaka et al., Title: Test System for Mobile Communication Terminal in Which Result of Connection-Transition Test Can Be Directly and Visually Grasped, Claiming priority of Japanese Application No. 2003-081443 fled in Japan on Mar. 24, 2003.

Chang Soon Kang et al., "CDMA Mobile Communication System Performance Analysis Tools for Network Parameter Planning" Vehicular Technology Conference, 1996, Mobile Technology for the Human Race., IEEE 46th Atlanta, GA USA Apr. 28-May 1, 1996, New York, NY USA, IEEE, US vol. 2, Apr. 28, 1996, pp. 894-898, XP010162518, ISBN: 0-7803-3157-5.

"Universal Mobile Telecommunications System (UMTS); Terminal Conformance Specificiation, Radio Transmission and Reception (FDD)" (3GPP TS 34.121. Version 3.11.0 Release 1999); ESTSE TS 134 121 ETSI ANTIPO, FR, vol. 3-tl, No. V3110, Dec. 2002, XP014010317, ISSN: 0000-001.

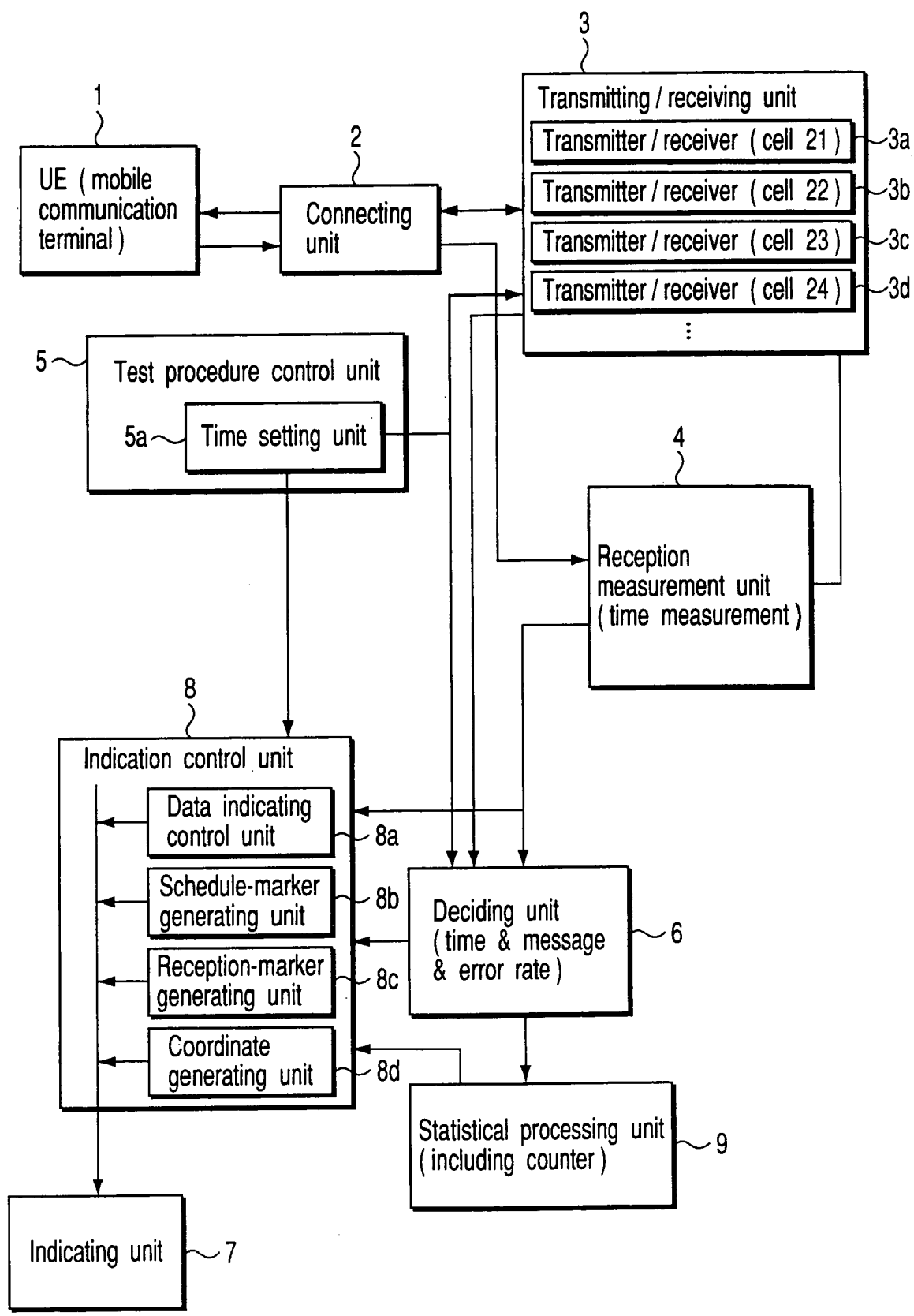
F I G. 1

TEST SYSTEM FOR MOBILE COMMUNICATION TERMINAL IN WHICH STATE OF PROGRESS OF CONNECTION-TRANSITION TEST CAN BE VISUALLY RECOGNIZED

CROSS-REFERENCE TO RELATED APPLICATIONS

This application is based upon and claims the benefit of priority from prior Japanese Patent Application No. 2003-081442, filed Mar. 24, 2003, the entire contents of which are incorporated herein by reference.

BACKGROUND OF THE INVENTION

1. Field of the Invention

The present invention relates to a test system for a mobile communication terminal which has a system simulator function capable of communication connection with a mobile communication terminal, and which is for testing whether or not a connection state of the mobile communication terminal appropriately transits between cells in accordance with movement of the mobile communication terminal between the cells, by using a mobile communication terminal of a cellular system which moves among cells (units of service areas of respective base stations), and in particular, to a test system for a mobile communication terminal in which a technique that an operator can visually recognize a connection state or/and the progressing situation of a test at the time of carrying out reception while transiting among the cells is used.

2. Description of the Related Art

Conventionally, for example, a cellular system is known as one of the communication systems using a mobile communication terminal such as a car telephone or a portable telephone.

FIG. 6 is a diagram for explanation of the relationship among cells (service areas).

That is, as shown in FIG. 6, in a communication system using base stations inn terminal 1 such as a car telephone or a portable telephone, as the cellular system, respective base stations 11, 12, 13, 14, . . . make the mobile communication terminal 1 be able to carry out communication by registering a position of the mobile communication terminal 1 when the mobile communication terminal 1 comes into cells 21, 22, 23, 24, . . . which are the service areas called cells, respectively.

For example, when the mobile communication terminal 1 moves from the cell 21 to the cell 22, in a case where the cell 21 and the cell 22 can receive communication services from both of the base stations 11 and 12, the mobile communication terminal 1 can use incoming radio waves whose power is stronger power among the incoming ratio waves of the both cells, or can use the incoming waves from the both cells.

In this case, when the mobile communication terminal 1 moves among the cells as described above, the mobile communication terminal 1 automatically switches the connection state from the base station 11 to the base station 12 (hereinafter, this is called "a transition of the connection state").

Accordingly, at the manufacturer of the mobile communication terminal 1, it is necessary to test in advance, before the shipping of the mobile communication terminal 1, whether or not the transition of the connection state is correctly executed in the mobile communication terminal 1, and how the communication quality is at that time, for example, the error rate of the data.

At the time of carrying out such a test, a method has been used in which the mobile communication terminal 1 itself is not moved and the position thereof is fixed, and test signals corresponding to the cells 21, 22, 23, 24, . . . are generated at the test system side, and by carrying out dummy communication with the mobile communication terminal 1 in accordance with a protocol along the communication system, the transition and the quality of the connection state of the mobile communication terminal 1 are tested.

Namely, at the test system side, a system simulator is configured, and the system simulator communicating with the mobile communication terminal 1, whereby the tests for the transition and the quality of the connection state of the mobile communication terminal 1 are carried out.

As a method for testing a mobile communication terminal in such a communication system, for example, there is an RRM (Radio Resource Management) test in accordance with the regulation described in "3GPP TS 34. 121, V3. 11. 0, December 2002, 3GPP Organizational Partners (ARIB, CWTS, ETSI, T1, TTA, TTC), France, P. 316–330" which is the test regulation in the W-CDMA communication system.

To put it simply, the RRM test is that a connection test with a base station or a procedure test with respect to a mobile communication terminal is carried out.

FIG. 7 is a functional block diagram showing a configuration of the conventional test system for a mobile communication terminal in which the RRM test is carried out.

In FIG. 7, the transmitting/receiving unit 3 has functions of respective transmitter/receivers $3a$, $3b$, $3c$, $3d$, . . . which correspond to the cells 21, 22, 23, 24, . . . of FIG. 6.

Further, the functions of the respective transmitter/receivers $3a$, $3b$, $3c$, $3d$, . . . naturally include a function of carrying out communication connection by exchanging necessary messages with the mobile communication terminal (UE: User Equipment) 1 in accordance with a predetermined protocol in the same way as in the base stations 11, 12, 13, 14, . . . of FIG. 6.

The transmitting/receiving unit 3 transmits predetermined test signals to the mobile communication terminal 1 via a connecting unit 2 by the functions of the respective transmitter/receivers $3a$, $3b$, $3c$, $3d$, . . . .

A reception measurement unit 4 has a function of confirming a transition and testing a quality of the connection state of the mobile communication terminal 1 by analyzing and measuring a response signal transmitted from the mobile communication terminal 1 due to the communication connection between the transmitting/receiving unit 3 and the mobile communication terminal 1.

Note that the transmitting/receiving unit 3 and the reception measurement unit 4 are configured so as to operate synchronously with one another in time.

Further, the reception measurement unit 4 has a function of time measurement or the like.

Because the mobile communication terminal 1 carries out transmission and reception with the transmitting/receiving unit 3 by radio propagation signals, the reception measurement unit 4 is configured so as to have a spectrum analyzer or the like which can measure the spectrum, the band, power, or the like of the propagation signals, built-in in order to test the characteristic of the propagation signal at a radio frequency region.

With respect to the time measurement at the reception measurement unit 4, a response signal from the mobile communication terminal 1 is received in response to the test signal from the transmitting/receiving unit 3, and that time is measured.

For example, the reception measurement unit 4 measures the time by carrying out time region measurement in the same way as in an oscilloscope by converting the received frequency from the mobile communication terminal 1 into an intermediate frequency by the built-in spectrum analyzer, and a time-sweeping at the intermediate frequency.

As described above, the transmitting/receiving unit 3 and the reception measurement unit 4 have both of the system simulator function and the measuring function (testing function).

In the following description, there are cases in which the transmitting/receiving unit 3 and the reception measurement unit 4 are collectively called a system simulator.

At the connecting unit 2, the mobile communication terminal 1 and the system simulator may be connected to one another in both directions by a cable, or may be connected to one another via an antenna.

A test procedure control unit 5 has a time setting unit 5a, and controls the system simulator by outputting control information including time setting information along the testing method in the above-described communication method, for example, the RRM test procedure of the W-CDMA as described above.

In particular, in the communication system as described above, when the mobile communication terminal 1 moves among the cells, this mobile communication terminal 1 completing the switching of receipt and the registering, and then transiting so that receipt of a predetermined quality is possible, within a predetermined time-passage, are determined in accordance with regulations. Therefore, the mobile communication terminal 1 must satisfy these sequential operations.

Accordingly, the test procedure control unit 5 has a predetermined procedure for causing the mobile communication terminal 1 to carry out the sequential operations along the regulation via the system simulator.

When the system simulator is operating in accordance with the setting at the time setting unit 5a of the test procedure control unit 5, a deciding unit 6 decides whether or not the transition, among the cells of the connection state at the mobile communication terminal 1 is being carried out within a predetermined time by repeating the test many times, for example, 1000 times.

The deciding unit 6 statistically determines the results of the repetitive decisions, and outputs the final test results as numeric data to an indicating unit 9 or the like.

In the test system for the mobile communication terminal according to the prior art, an indication on the indicating unit 9 depends on the numeric indication by only numeric data in accordance with each measurement item.

Accordingly, in the test system for the mobile communication terminal according to the prior art, for example, the rate of the successes (pass: success in separating from one cell and connecting to the other cell) and the failures (fail: error in separating from one cell and connecting to the other cell) of the scheduled transition of the connection among the cells at the time of repeating testing 1000 times, is numerically indicated.

Further, in the test system for the mobile communication terminal according to the prior art, there are cases in which the rate of failures exceeds a predetermined allowable range, and in which the number of times thereof is indicated numerically, and the like.

However, in the test system for the mobile communication terminal according to the prior art as described above, because the indication of the test results of the transition tests or the like of the connection state, by the system simulator, of the mobile communication terminal depends on the numerically indicating of only numeric data, there is the problem that it is difficult for the operator to grasp the progress of the test, and to grasp where a connection error is arising, or in what state (at what time-passage) the connection error is arising.

Therefore, in such a kind of test system for a mobile communication terminal, it has been strongly desired that the state of progress of and a confirmation of the success or failure of the transition of the connection state by a system simulator of the mobile communication terminal are indicated so as to be visually recognizable by the operator.

BRIEF SUMMARY OF THE INVENTION

An object of the present invention is to provide a test system for a mobile communication terminal in which, in a connection test of a mobile communication terminal by a system simulator, it is decided whether or not a connection-transition of the mobile communication terminal between cells is being carried out as scheduled, and in which, by indicating the results thereof together with the transition of the connection state, it is possible for an operator to visually recognize to which cell the connection state has been transferred at what time, and whether the transition is a success or a failure, and for the operator to visually recognize the state of progress of the test.

In order to achieve the above object, according to a first aspect of the present invention, there is provided a test system for a mobile communication terminal, comprising:

a test procedure control unit (5) which possesses a procedure for carrying out a transition test of a connection state of a mobile communication terminal of a cellular system, and outputs control information including time setting information along the procedure;

a transmitting/receiving unit (3) which, in accordance with the control information from the test procedure control unit, generates a plurality of test signals corresponding to a plurality of cells in the cellular system, varies the plurality of test signals so as to be successively stronger in accordance with a scheduled time-passage and transmits the signals toward the mobile communication terminal, and receives a response signal from the mobile communication terminal;

a reception measurement unit (4) which measures a transition time of the connection state among the cells of the mobile communication terminal, the transition time being a time when the mobile communication terminal switches from a state of receiving one test signal among the plurality of test signals to a state of receiving another test signal, in accordance with the response signal from the mobile communication terminal;

a deciding unit (6) which receives a measured result of the transition time from the reception measurement unit, and decides whether or not the connection state of the mobile communication terminal is transiting among the plurality of cells in the cellular system in accordance with the scheduled time-passage;

an indicating unit (7) which indicates results of the transition test of the connection state of the mobile communication terminal; and an indication control unit (8) which receives the decided result of the connection state from the deciding unit and the measured result of the transition time from the reception measurement unit, and causes the indicating unit to indicate, as a result of the transition test of the connection state of the mobile communication terminal, the decided result of the connection state and the transition among the cells of the connection state of the mobile communication terminal corresponding to the time-passage, so as to be visually recognizable on a single coordinate.

In order to achieve the above object, according to a second aspect of the present invention, there is provided a test system for a mobile communication terminal according to the first aspect, wherein the test system for a mobile communication terminal further comprises:

a statistical processing unit (9) which determines a transition success rate showing establishment of successes in the transitions among the cells of the connection state of the mobile communication terminal for each time interval corresponding to the time-passage on the basis of the decided result of the connection state from the deciding unit, and the indication control unit (8) indicates the transition success rate showing the establishment of successes in transitions among the cells of the connection state of the mobile communication terminal for each time interval corresponding to the time-passage determined by the statistical processing unit, so as to be visually recognizable on the single coordinate.

In order to achieve the above object, according to a third aspect of the present invention, there is provided a test system for a mobile communication terminal according to the first aspect, wherein the indication control unit includes a coordinate generating unit which generates, as the single coordinate, a coordinate showing the time-passage corresponding to at least two cells, and indicates the coordinate on the indicating unit.

In order to achieve the above object, according to a fourth aspect of the present invention, there is provided a test system for a mobile communication terminal according the third aspect, wherein the indication control unit includes a schedule-marker generating unit which generates a schedule-marker showing a schedule of transition among the cells of the connection state of the mobile communication terminal according to the scheduled time-passage, and indicates the schedule-marker in advance on the coordinate that shows the time-passage and that is displayed by the coordinate generating unit, in accordance with time setting information from the test procedure control unit.

In order to achieve the above object, according to a fifth aspect of the present invention, there is provided a test system for a mobile communication terminal according to the fourth aspect, wherein the indication control unit includes a reception-marker generating unit which receives a decided result of the connection state from the deciding unit, generates a reception-marker showing the decided result that is obtained at every time when the connection state transits in accordance with the time-passage, and indicates the reception-marker, together with the schedule-marker generated by the schedule-marker generating unit, on the coordinate that shows the time-passage and that is displayed by the coordinate generating unit; and an indicating position of the reception-marker shows a current time.

In order to achieve the above object, according to a sixth aspect of the present invention, there is provided a test system for a mobile communication terminal according to the fifth aspect, wherein the schedule-marker generated by the schedule-marker generating unit is varied so as to be recognizable from the initial schedule marker in accordance with progress of the transition among the cells of the connection state of the mobile communication terminal.

In order to achieve the above object, according to a seventh aspect of the present invention, there is provided a test system for a mobile communication terminal according to the fifth aspect, wherein the reception-marker generated by the reception-marker generating unit includes a reception-marker relating to decided results of idling and registration of the mobile communication terminal which are carried out prior to the transition among the cells of the connection state of the mobile communication terminal.

In order to achieve the above object, according to an eighth aspect of the present invention, there is provided a test system for a mobile communication terminal according to the seventh aspect, wherein the reception-markers generated by the reception-marker generating unit are varied such that a reception-marker showing the decided result in the past and a reception-marker showing the decided result at present can be recognized from one another.

In order to achieve the above object, according to a ninth aspect of the present invention, there is provided a test system for a mobile communication terminal according to the first aspect, wherein the test procedure control unit (5) has a computer (PC) and computer readable program code means (CRC) for causing the computer to carry out a transition test of a connection state of a mobile communication terminal of a cellular system, and outputs control information including time setting information along the computer readable program code means.

In order to achieve the above object, according to a tenth aspect of the present invention, there is provided a test system for a mobile communication terminal according to the ninth aspect, wherein the deciding unit (6) and the indication control unit (8) are constructed as software of the computer together with the test procedure control unit (5).

In order to achieve the above object, according to an eleventh aspect of the present invention, there is provided a test system for a mobile communication terminal according to the tenth aspect, wherein the computer readable program code means (CRC) comprises:

first computer readable program code means for, in accordance with the control information from the test procedure control unit, causing the transmitting/receiving unit (3) to generate a plurality of test signals corresponding to a plurality of cells in the cellular system, to vary the plurality of test signals so as to be successively stronger in accordance with a scheduled time-passage and transmit the signals toward the mobile communication terminal, and to receive a response signal from the mobile communication terminal;

second computer readable program code means for causing the reception measurement unit (4) to measure a transition time of the connection state among the cells of the mobile communication terminal, the transition time being a time when the mobile communication terminal switches from a state of receiving one test signal among the plurality of test signals to a state of receiving another test signal, in accordance with the response signal from the mobile communication terminal;

third computer readable program code means for causing the deciding unit (6) to receive a measured result of the transition time from the reception measurement unit, and to decide whether or not the connection state of the mobile communication terminal is transiting among the plurality of cells in the cellular system in accordance with the predetermined time-passage; and fourth computer readable program code means for causing the indication control unit (8) to receive a decided result of the connection state from the deciding unit and the measured result of the transition time from the reception measurement unit, and to control for causing the indicating unit to indicate, as a result of the transition test of the connection state of the mobile communication terminal, the decided result of the connection state and the transition among the cells of the connection state of the mobile communication terminal corresponding to the time-passage, so as to be visually recognizable on a single coordinate.

In order to achieve the above object, according to a twelfth aspect of the present invention, there is provided a test system for a mobile communication terminal according to the second aspect, wherein the test procedure control unit (5) has a computer (PC) and computer readable program code means (CRC) for causing the computer to carry out a transition test of a connection state of a mobile communication terminal of a cellular system, and outputs control information including time setting information along the computer readable program code means, the statistical processing unit (9) is constructed as a software of the computer together with the deciding unit (6), the indication control unit (8), and the test procedure control unit (5), and the computer readable program code means (CRC) comprises:

first computer readable program code means for causing the transmitting/receiving unit (3) to generate a plurality of test signals corresponding to a plurality of cells in the cellular system in accordance with the control information from the test procedure control unit, to vary the plurality of test signals so as to be successively stronger in accordance with a scheduled time-passage and transmit the signals toward the mobile communication terminal, and to receive a response signal from the mobile communication terminal;

second computer readable program code means for causing the reception measurement unit (4) to measure a transition time of the connection state among the cells of the mobile communication terminal, the transition time being a time when the mobile communication terminal switches from a state of receiving one test signal among the plurality of test signals to a state of receiving another test signal, in accordance with the response signal from the mobile communication terminal;

third computer readable program code means for causing the deciding unit (6) to receive a measured result of the transition time from the reception measurement unit, and to decide whether or not the connection state of the mobile communication terminal is transiting among the plurality of cells in the cellular system in accordance with the predetermined time-passage;

fourth computer readable program code means for causing the indication control unit (8) to receive the decided result of the connection state from the deciding unit and receive the measured result of the transition time from the reception measurement unit, and to control for causing the indicating unit to indicate, as a result of the transition test of the connection state of the mobile communication terminal, the decided result of the connection state and the transition among the cells of the connection state of the mobile communication terminal corresponding to the time-passage, so as to be visually recognizable on a single coordinate;

fifth computer readable program code means for causing the statistical processing unit (9) to determine a transition success rate showing establishment of successes in transitions among the cells of the connection state of the mobile communication terminal for each time interval corresponding to the time-passage on the basis of the decided result of the connection state from the deciding unit; and sixth computer readable program code means for causing the indication control unit (8) to carry out controls for indicating the transition success rate showing the establishment of successes in transitions among the cells of the connection state of the mobile communication terminal for each time interval corresponding to the time-passage determined by the statistical processing unit, so as to be visually recognizable on the single coordinate.

In order to achieve the above object, according to a thirteenth aspect of the present invention, there is provided a method for testing a mobile communication terminal, comprising:

preparing a test procedure control unit (5) which possesses a procedure for carrying out a transition test of a connection state of a mobile communication terminal of a cellular system, and outputs control information including time setting information along the procedure;

in accordance with the control information from the test procedure control unit, generating a plurality of test signals corresponding to a plurality of cells in the cellular system, varying the plurality of test signals so as to be successively stronger in accordance with a scheduled time-passage and transmitting the signals toward the mobile communication terminal, and receiving a response signal from the mobile communication terminal;

measuring a transition time of the connection state among the cells of the mobile communication terminal, the transition time being a time when the mobile communication terminal switches from a state of receiving one test signal among the plurality of test signals to a state of receiving another test signal, in accordance with the response signal from the mobile communication terminal;

receiving a measured result of the transition time, and deciding whether or not the connection state of the mobile communication terminal is transiting among the plurality of cells in the cellular system in accordance with the scheduled time-passage; and receiving the decided result of the connection state and the measured result of the transition time, and causing the indicating unit to indicate, as a result of the transition test of the connection state of the mobile communication terminal, the decided result of the connection state and the transition among the cells of the connection state of the mobile communication terminal corresponding to the time-passage, so as to be visually recognizable on a single coordinate.

In order to achieve the above object, according to a fourteenth aspect of the present invention, there is provided a method for testing a mobile communication terminal according to the thirteenth aspect, wherein the method for testing a mobile communication terminal further comprises:

determining a transition success rate showing establishment of successes in the transitions among the cells of the connection state of the mobile communication terminal for each time interval corresponding to the time-passage on the basis of the decided result of the connection state; and indicating the transition success rate showing the establishment of successes in transitions among the cells of the connection state of the mobile communication terminal for each time interval corresponding to the time-passage, so as to be visually recognizable on the single coordinate.

In order to achieve the above object, according to a fifteenth aspect of the present invention, there is provided a test system for a mobile communication terminal, comprising:

test procedure control means (5) for possessing a procedure for carrying out a transition test of a connection state of a mobile communication terminal of a cellular system, and outputting control information including time setting information along the procedure;

transmitting/receiving means (3) for, in accordance with the control information from the test procedure control means, generating a plurality of test signals corresponding to a plurality of cells in the cellular system, varying the plurality of test signals so as to be successively stronger in accordance with a scheduled time-passage and transmitting the signals toward the mobile communication terminal, and receiving a response signal from the mobile communication terminal;

reception measurement means (4) for measuring a transition time of the connection state among the cells of the mobile communication terminal, the transition time being a time when the mobile communication terminal switches from a state of receiving one test signal among the plurality of test signals to a state of receiving another test signal, in accordance with the response signal from the mobile communication terminal;

deciding means (6) for receiving a measured result of the transition time from the reception measurement means, and deciding whether or not the connection state of the mobile communication terminal is transiting among the plurality of cells in the cellular system in accordance with the scheduled time-passage;

indicating means (7) for indicating the result of the transition test of the connection state of the mobile communication terminal; and indication control means (8) for receiving the decided result of the connection state from the deciding means and the measured result of the transition time from the reception measurement means, and causing the indicating means indicate, as results of the transition test of the connection state of the mobile communication terminal, the decided result of the connection state and the transition among the cells of the connection state of the mobile communication terminal corresponding to the time-passage, so as to be visually recognizable on a single coordinate.

In order to achieve the above object, according to a sixteenth aspect of the present invention, there is provided a test system for a mobile communication terminal according to the fifteenth aspect, wherein the test system for a mobile communication terminal further comprises:

statistical processing means (9) for determining a transition success rate showing establishment of successes in the transitions among the cells of the connection state of the mobile communication terminal for each time interval corresponding to the time-passage on the basis of the decided result of the connection state from the deciding means, and the indication control means (8) indicates the transition success rate showing the establishment of successes in transitions among the cells of the connection state of the mobile communication terminal for each time interval corresponding to the time-passage determined by the statistical processing means, so as to be visually recognizable on the single coordinate.

In order to achieve the above object, according to a seventeenth aspect of the present invention, there is provided a test system for a mobile communication terminal according to the fifteenth aspect, wherein the indication control means includes coordinate generating means for generating, as the single coordinate, a coordinate showing the time-passage corresponding to at least two cells, and indicating the coordinate on the indicating means.

In order to achieve the above object, according to an eighteenth aspect of the present invention, there is provided a test system for a mobile communication terminal according to the seventeenth aspect, wherein the indication control means includes schedule-marker generating means for generating a schedule-marker showing a schedule of a transition among the cells of the connection state of the mobile communication terminal according to the scheduled time-passage, and indicating the schedule-marker in advance on the coordinate that shows the time-passage and that is displayed by the coordinate generating means, in accordance with time setting information from the test procedure control means.

In order to achieve the above object, according to a nineteenth aspect of the present invention, there is provided a test system for a mobile communication terminal according to the eighteenth aspect, wherein the indication control means includes reception-marker generating means for receiving a decided result of the connection state from the deciding means, generating a reception-marker showing the decided result that is obtained at every time when the connection state transits in accordance with the time-passage, and indicating the reception-marker, together with the schedule-marker generated by the schedule-marker generating means on the coordinate that shows the time-passage and that is displayed by the coordinate generating means; and an indicating position of the reception-marker shows a current time.

In order to achieve the above object, according to a twentieth aspect of the present invention, there is provided a test system for a mobile communication terminal according to the nineteenth aspect, wherein the schedule-marker generated by the schedule-marker generating means is varied so as to be recognizable from the initial schedule marker in accordance with progress of the transition among the cells of the connection state of the mobile communication terminal.

In order to achieve the above object, according to a twenty-first aspect of the present invention, there is provided a test system for a mobile communication terminal according to the nineteenth aspect, wherein the reception-marker generated by the reception-marker generating means includes a reception-marker relating to decided results of idling and registration of the mobile communication terminal which are carried out prior to the transition among the cells of the connection state of the mobile communication terminal.

In order to achieve the above object, according to a twenty-second aspect of the present invention, there is provided a test system for a mobile communication terminal according to the twenty-first aspect, wherein the reception-markers generated by the reception-marker generating means are varied such that a reception-marker showing the decided result in the past and a reception-marker showing the decided result at present can be recognized from one another.

In order to achieve the above object, according to a twenty-third aspect of the present invention, there is provided a test system for a mobile communication terminal according to the fifteenth aspect, wherein the test procedure control means (5) has a computer (PC) and computer readable program code means (CRC) for causing the computer to carry out a transition test of a connection state of a mobile communication terminal of a cellular system, and outputs control information including time setting information along the computer readable program code means.

In order to achieve the above object, according to a twenty-fourth aspect of the present invention, there is provided a test system for a mobile communication terminal according to the twenty-third aspect, wherein the deciding means (6) and the indication control means (8) are constructed as software of the computer together with the test procedure control means (5).

In order to achieve the above object, according to a twenty-fifth aspect of the present invention, there is provided a test system for a mobile communication terminal according to the twenty-fourth aspect, wherein the computer readable program code means (CRC) comprises:

first computer readable program code means for, in accordance with the control information from the test procedure control means, causing the transmitting/receiving means (3) to generate a plurality of test signals corresponding to a plurality of cells in the cellular system, to vary the plurality of test signals so as to be successively stronger in accordance with a scheduled time-passage and transmit the signals toward the mobile communication terminal, and to receive a response signal from the mobile communication terminal;

second computer readable program code means for causing the reception measurement means (4) to measure a transition time of the connection state among the cells of the mobile communication terminal, the transition time being a time when the mobile communication terminal switches from a state of receiving one test signal among the plurality of test signals to a state of receiving another test signal, in accordance with the response signal from the mobile communication terminal;

third computer readable program code means for causing the deciding means (6) to receive a measured result of the transition time from the reception measurement means, and to decide whether or not the connection state of the mobile communication terminal is transiting among the plurality of cells in the cellular system in accordance with the predetermined time-passage; and fourth computer readable program code means for causing the indication control means (8) to receive the decided result of the connection state from the deciding means and the measured result of the transition time from the reception measurement means, and to control for causing the indicating means to indicate, as results of the transition test of the connection state of the mobile communication terminal, the decided result of the connection state and the transition among the cells of the connection state of the mobile communication terminal corresponding to the time-passage, so as to be visually recognizable on a single coordinate.

In order to achieve the above object, according to a twenty-sixth aspect of the present invention, there is provided a test system for a mobile communication terminal according to the sixteenth aspect, wherein the test procedure control means (5) has a computer (PC) and computer readable program code means (CRC) for causing the computer to carry out a transition test of a connection state of a mobile communication terminal of a cellular system, and outputs control information including time setting information along the computer readable program code means, the statistical processing means (9) is constructed as a software of the computer together with the deciding means (6), the indication control means (8), and the test procedure control means (5), and the computer readable program code means (CRC) comprises:

first computer readable program code means for, in accordance with the control information from the test procedure control means, causing the transmitting/receiving means (3) to generate a plurality of test signals corresponding to a plurality of cells in the cellular system, to vary the plurality of test signals so as to be successively stronger in accordance with a scheduled time-passage and transmit the signals toward the mobile communication terminal, and to receive a response signal from the mobile communication terminal;

second computer readable program code means for causing the reception measurement means (4) to measure a transition time of the connection state among the cells of the mobile communication terminal, the transition time being a time when the mobile communication terminal switches from a state of receiving one test signal among the plurality of test signals to a state of receiving another test signal, in accordance with the response signal from the mobile communication terminal;

third computer readable program code means for causing the deciding means (6) to receive a measured result of the transition time from the reception measurement means, and to decide whether or not the connection state of the mobile communication terminal is transiting among the plurality of cells in the cellular system in accordance with the predetermined time-passage;

fourth computer readable program code means for causing the indication control means (8) to receive the decided result of the connection state from the deciding means and the measured result of the transition time from the reception measurement means, and to control for causing the indicating means to indicate, as results of the transition test of the connection state of the mobile communication terminal, the decided result of the connection state and the transition among the cells of the connection state of the mobile communication terminal corresponding to the time-passage, so as to be visually recognizable on a single coordinate;

fifth computer readable program code means for causing the statistical processing means (9) to determine a transition success rate showing establishment of successes in transitions among the cells of the connection state of the mobile communication terminal for each time interval corresponding to the time-passage on the basis of the decided result of the connection state from the deciding means; and sixth computer readable program code means for causing the indication control means (8) to control for indicating the transition success rate showing the establishment of successes in transitions among the cells of the connection state of the mobile communication terminal for each time interval corresponding to the time-passage determined by the statistical processing means, so as to be visually recognizable on the single coordinate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a functional block diagram showing a configuration of a test system for a mobile communication terminal according to one embodiment of the present invention;

DETAILED DESCRIPTION OF THE INVENTION

Figure 2A:
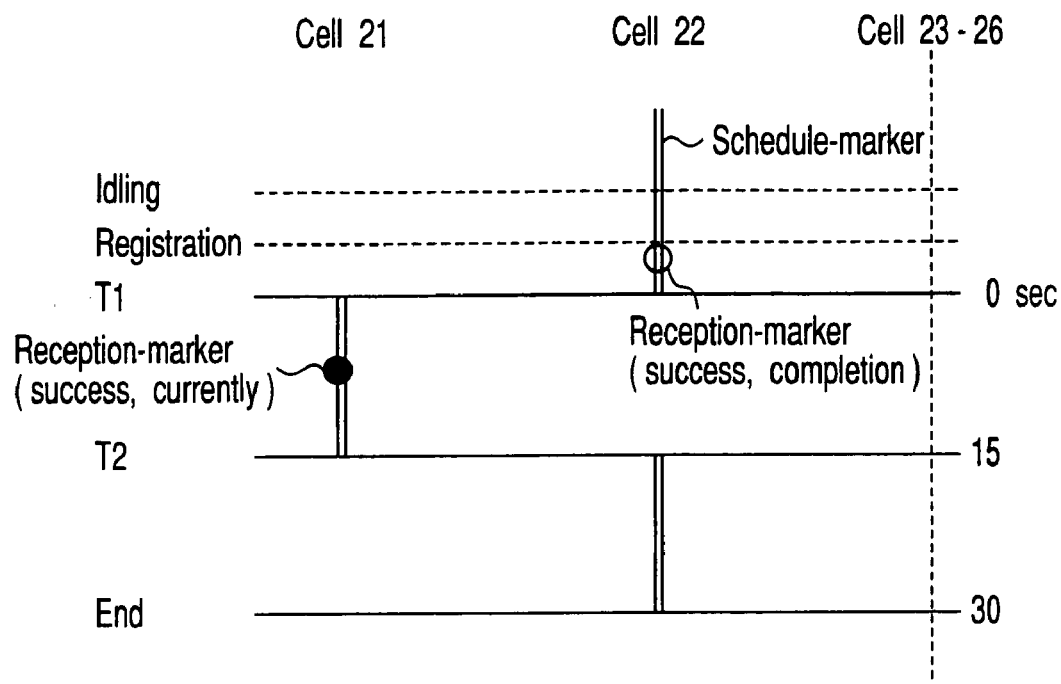
FIGS. 2A and 2B are diagrams for explanation of an example of a transition of a connection state, between cells, of a mobile communication terminal 1 to which the test system for the mobile communication terminal of FIG. 1 is applied.

Reference will now be made in detail to the presently preferred embodiments of the invention as illustrated in the accompanying drawings, in which like reference numerals designate like or corresponding parts.

A test system for a mobile communication terminal according to the present invention has the feature in that, when a transition of a connection state between cells of a mobile communication terminal 1 is tested for a predetermined time-passage, by making an operator be able to visually recognize the situation, in a map form, in which the test is progressing for the time-passage, and be able to visually recognize a success or a failure in the transition of the connection state, the operator can directly grasp an error in operation during the time-passage.

Hereinafter, the test system for the mobile communication terminal according to the invention will be described with reference to the drawings.

FIG. 1 is a block diagram showing a functional configuration of the test system for the mobile communication terminal according to the invention.

FIGS. 2A to 5 are diagrams for explanation of examples of transitions of connection states among the cells of the mobile communication terminal 1 to which the test system for the mobile communication terminal in accordance with the present invention is applied.

First, the functional configuration of the test system for the mobile communication terminal according to the invention will be described on the basis of FIG. 1.

Figure 7:
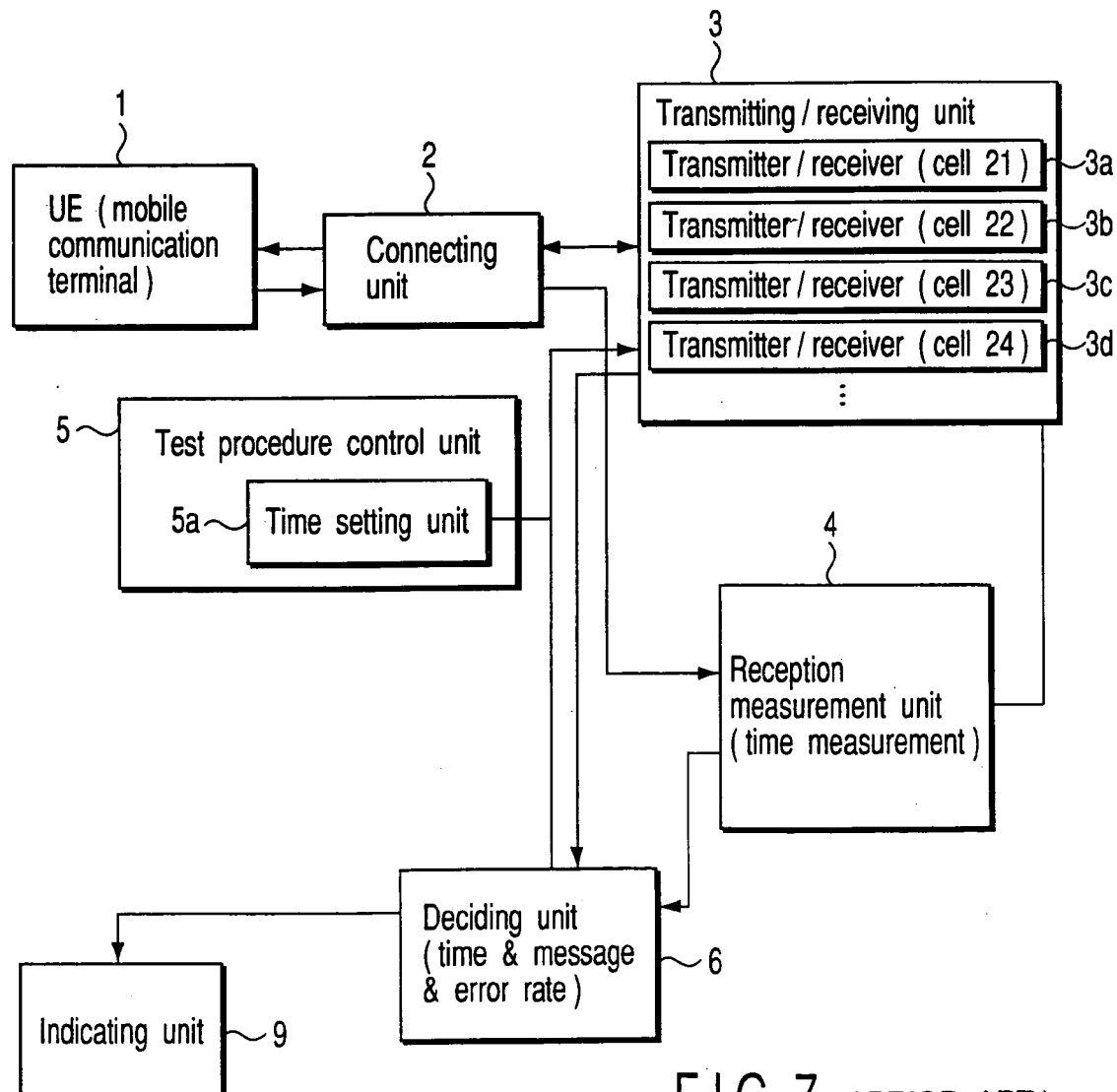
FIG. 7 is a functional block diagram showing a configuration of a conventional test system, which carries out RRM test, of a mobile communication terminal.

In FIG. 1, the functions of reference numerals which are the same as those of FIG. 7 described in the prior art are, except for that of the deciding unit 6, the same as the functions of those of FIG. 7 as well, and therefore, detailed descriptions thereof will be omitted.

As shown in FIG. 1, the mobile communication terminal testing device according to a first embodiment of the present invention is constituted of: a test procedure control unit 5 which possesses a procedure for making a transition test of a connection state of the mobile communication terminal 1 of a cellular system to be carried out, and outputs control information including time setting information along the procedure; a transmitting/receiving unit 3 which generates a plurality of test signals corresponding to a plurality of cells in the cellular system in accordance with the control information from the test procedure control unit 5, varies the plurality of test signals so as to be successively stronger in accordance with a scheduled time-passage and transmits the signals toward the mobile communication terminal 1, and receives a response signal from the mobile communication terminal 1; a reception measurement unit 4 which measures a transition time of the connection state among the cells of the mobile communication terminal 1, the transition time being a time when the mobile communication terminal 1 switches from a state of receiving one test signal among the plurality of test signals to a state of receiving another test signal in accordance with the response signal from the mobile communication terminal 1; a deciding unit 6 which receives the measured result of the transition time from the reception measurement unit 4, and decides whether or not the connection state of the mobile communication terminal 1 is transiting among the plurality of cells in the cellular system in accordance with the scheduled time-passage; an indicating unit 7 which indicates the result of the transition test of the connection state of the mobile communication terminal 1; and an indication control unit 8 which receives the decided result of the connection state from the deciding unit 6 and the measured result of the transition time from the reception measurement unit 4, and causes the indicating unit 7 to indicate as the result of the transition test of the connection state of the mobile communication terminal 1, the decided result of the connection state and the transition between cells of the connection state of the mobile communication terminal 1 corresponding to the time-passage, so as to be visually recognizable on a single coordinate.

Further, as shown in FIG. 1, a mobile communication terminal testing device according to a second embodiment of the present invention further has a statistical processing unit 9 which determines a transition success rate showing the establishment of successes in the transitions between cells of the connection state of the mobile communication terminal for each time interval corresponding to the time-passage on the basis of the decided result of the connection state from the deciding unit, and the indication control unit 8 is configured so as to indicate the transition success rate showing the establishment of successes in transitions among the cells of the connection state of the mobile communication terminal for each time interval corresponding to the time-passage determined by the statistical processing unit, so as to be visually recognizable on the single coordinate.

Further, concretely, in FIG. 1, the deciding unit 6 decides whether or not the transition between cells of a connection state at the mobile communication terminal 1 is carried out within a predetermined time. However, as will be described in Example 2 which will be described later, the deciding unit 6 is configured so as to decide the contents of the message and the error rate in a test in which a call is carried out with a system simulator.

The deciding unit 6 is configured so as to receive in advance the time and the message which will be the standards at the time of deciding from the test procedure control unit 5.

Further, the indication control unit 8 forms the featured portion of the present invention, and is configured by including a data indication control unit 8a, a schedule-marker generating unit 8b, a reception-marker generating unit 8c, and a coordinate generating unit 8d.

Here, in the same way as in the prior art as described above, the data indication control unit 8a indicates, for example, numeric data relating to the results which the deciding unit 6 decided by 1000 times of tests, or measured values measured by the reception measurement unit 4, or the like on an indication screen of the indicating unit 7.

The coordinate generating unit 8*d* forms in advance a coordinate for indicating the result of the measurement which has been scheduled on the indication screen of the indicating unit 7, on the indication screen of the indicating unit 7 in accordance with the measuring procedure which the test procedure control unit 5 stores therein along the regulation "3GPP TS 34. 121" in the above-described communication system of the W-CDMA.

Figure 2B:
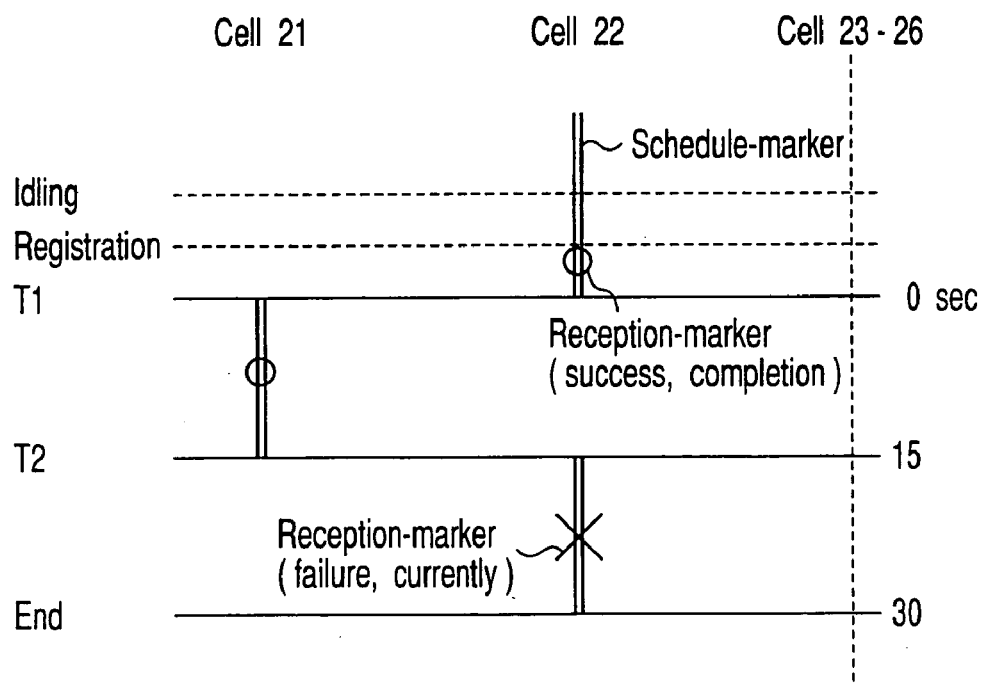

The coordinate generating unit 8*d* prepares, for example, as shown in FIGS. 2A and 2B, a two-dimensional coordinate space by taking cells 21, 22, 23, . . . as the abscissas, and by taking the ordinate as a time base showing a state of transiting in accordance with a time-passage.

In this case, as a test plan, as shown in FIGS. 2A and 2B, because the mobile communication terminal 1 transits between the cell 21 and the cell 22, and the idling, the registration of position with the base station, and the transitions at times T1 and T2 are scheduled, those times are indicated on the indication screen of the indicating unit 7.

Accordingly, the coordinate generating unit 8*d* has calculating means for calculating in advance a position of the coordinate on the indication screen of the indicating unit 7.

The coordinate information is used for the schedule-marker generating unit 8*b* and the reception-marker generating unit 8*c* which will be described as follows.

Further, the schedule-marker generating unit 8*b* receives time information which is set by the time setting unit 5*a* in accordance with the procedure from the test procedure control unit 5, generates the schedule-markers shown by the double lines of FIGS. 2A and 2B at the coordinate space, and indicates the schedule-markers on the indication screen of the indicating unit 7.

FIGS. 2A and 2B show the states in which a schedule for carrying out a transition test of the connection state of the mobile communication terminal 1 is being indicated on the indication screen of the indicating unit 7, in the form that the mobile communication terminal 1 first receives the service by receiving the signal of the base station corresponding to the cell 22 up to T1, receives the service by receiving the signal corresponding to the base station of the cell 21 from T1 up to T2 (for 15 seconds), and receives the service of the cell 22 again from T2 to the end (for 15 seconds).

The positions of the above-described schedule-markers of the double line of FIGS. 2A and 2B show the transition schedule of the connection state of the mobile communication terminal 1.

In addition, the reception-marker generating unit 8*c* generates a reception-marker designated by ○ or a reception-marker designated by ● which shows the decided result by the deciding unit 6, and indicates the reception-marker on the schedule-marker generated and indicated by the schedule-marker generating unit 8*b* in the coordinate space on the indication screen of the indicating unit 7.

In FIGS. 2A and 2B, the reception-marker designated by ○ between the registration and T1 shows the state of being success and being completed due to the transition being carried out within the predetermined time (this case shows that the cell 22 receives first).

Furthermore, in FIG. 2A, the reception-marker designated by ● shows that the current time is within the time zone from T1 to T2, and the mobile communication terminal 1 is already switched from reception of the signal corresponding to the cell 22 to the signal corresponding to reception of cell 21 within a predetermined time, and the position of the reception-marker designated by ● shows the current time of the test, and shows the state of progress of the test as well, in addition to the above-described reception-marker designated by ○.

In FIG. 2B, a reception-marker designated by X shows an example in which the mobile communication terminal 1 failed in switching from reception of the cell 21 to reception of the cell 22 after T2.

Note that, in FIG. 1, the statistical processing unit 9 includes a counter. By counting and statistically processing the number of times of failures/successes by the deciding unit 6, for example, in order to indicate a transition success rate for each time interval, as carried out in Example 2 which will be described later, at a specific position on the indication screen of the indicating unit 7 by the coordinate generating unit 8*d*, on the basis of the result which the deciding unit 6 decided, the statistical processing unit 9 generates the statistical data.

Note that the test procedure control unit 5 has a personal computer PC and computer readable program code means CRC in which a program for causing the computer PC to carry out transition tests of the connection state of the mobile communication terminal 1 of the cellular system a predetermined number of times, is recorded in advance on a recording medium. The test procedure control unit 5 is configured so as to output the control information including the time setting information along the computer readable program code means CRC, whereby the test procedure control unit 5 may be configured so as to manage the entire control for carrying out transition tests of the connection state of the mobile communication terminal 1 the predetermined number of times via the system simulator.

Further, the deciding unit 6 and the indication control unit 8 may be constructed as software of the computer PC together with the test procedure control unit 5.

In this case, the computer readable program code means CRC comprises: first computer readable program code means for causing the transmitting/receiving unit 3 to generate a plurality of test signals corresponding to a plurality of cells in the cellular system in accordance with the control information from the test procedure control unit 5, to vary the plurality of test signals so as to be successively stronger in accordance with a predetermined time-passage and transmit the signals toward the mobile communication terminal 1, and to receive a response signal from the mobile communication terminal 1; second computer readable program code means for causing the reception measurement unit 4 to measure a transition time of the connection state among the cells of the mobile communication terminal 1, the transition time being a time when the mobile communication terminal 1 switches from a state of receiving one test signal among the plurality of test signals to a state of receiving another test signal in accordance with the response signal from the mobile communication terminal 1; third computer readable program code means for causing the deciding unit 6 to receive the measured result of the transition time from the reception measurement unit 4, and to decide whether or not the connection state of the mobile communication terminal 1 is transiting among the plurality of cells in the cellular system in accordance with the predetermined time-passage; and fourth computer readable program code means for causing the indication control unit 8 to receive the decided result of the connection state from the deciding unit 6 and the measured result of the transition time from the reception measurement unit 4, and to control for indicating, on the indicating unit 7, as the result of the transition test of the connection state of the mobile communication-terminal 1, the decided result of the connection state and a transition among the cells of the connection state of the mobile communication terminal 1 corresponding to the time-passage, so as to be visually recognizable on a single coordinate.

The statistical processing unit 9 also may be constructed as a software of the computer PC, in addition to the deciding unit 6, the indication control unit, and the test procedure control unit 5.

In this case, in addition to the above description, the signal computer readable program code means CRC further comprises: fifth computer readable program code means for causing the statistical processing unit 9 to determine a transition success rate showing the establishment of successes in transitions among the cells of the connection state of the mobile communication terminal 1 for each time interval corresponding to the time-passage on the basis of the decided result of the connection state from the deciding unit 6; and sixth computer readable program code means for causing the indication control unit 8 to control for indicating the transition success rate showing the establishment of successes in transitions among the cells of the connection state of the mobile communication terminal 1 for each time interval corresponding to the time-passage determined by the statistical processing unit 9, so as to be visually recognizable on the single coordinate.

EXAMPLE 1

Next, the flow of the concrete test operations of the test system for the mobile communication terminal in accordance with Example 1 of the present invention will be described with reference to FIGS. 1, 3A, 3B, and 3C.

(1) The test is started

In this case, in advance, the test procedure control unit 5 and the time setting unit 5a control the respective units of FIG. 1 in accordance with the measuring procedure in the regulation in the predetermined communication system as described above.

Figure 3A:
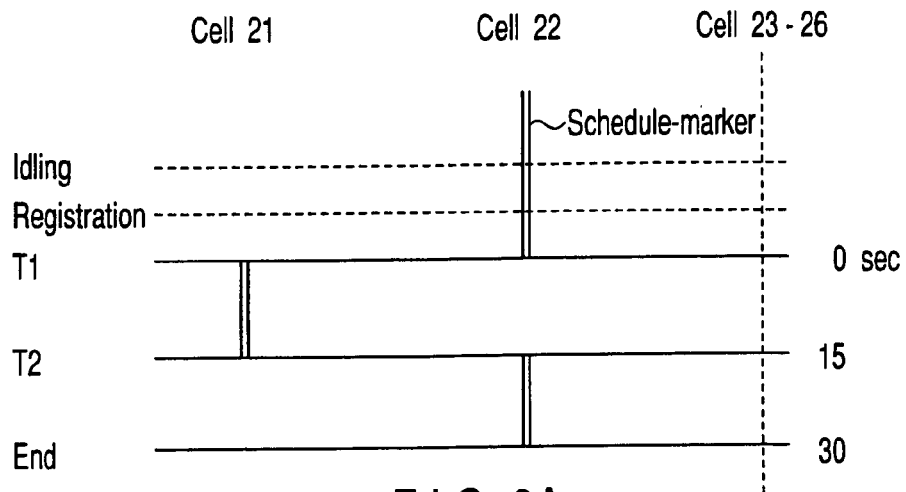
FIGS. 3A, 3B, and 3C are diagrams for explanation of another example of a transition of a connection state, among the cells, of the mobile communication terminal 1 to which the test system for the mobile communication terminal of FIG. 1 is applied.

First, the coordinate generating unit 8d receives time schedule information of the test from the time setting unit 5a, and indicates the cells 21, 22, . . . , and a time coordinate on the indication screen of the indicating unit 7 as shown in FIG. 3A.

Figure 3B:
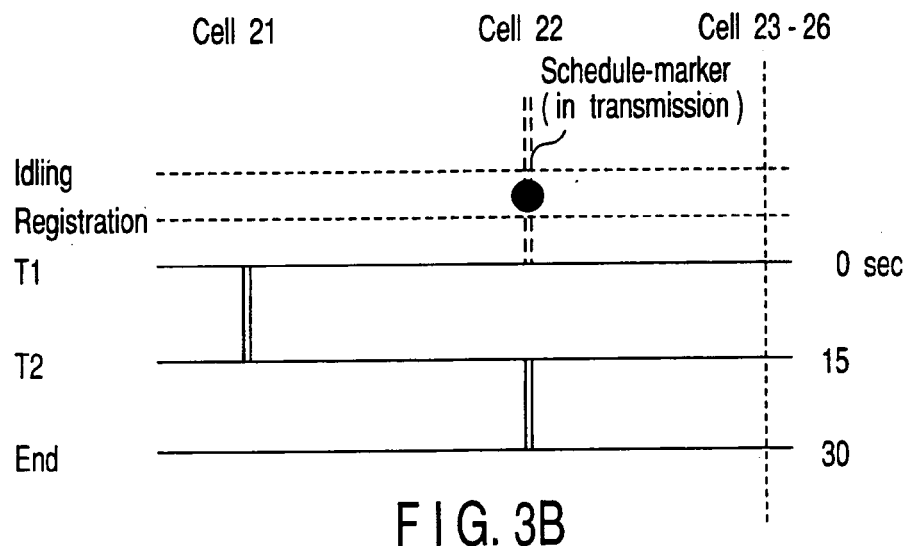

Further, as shown in FIG. 3A, the schedule-marker generating unit 8b indicates the marker of the double line showing the state of transition which has been scheduled on the time coordinate of the indication screen of the indicating unit 7. shown in FIG. 3B.

(3) The mobile communication terminal 1 starts preliminary idling for receiving the signal corresponding to the cell 22.

The transmitting/receiving unit 3 receives a response signal showing the idling start from the mobile communication terminal 1, and notifies the reception-marker generating unit 8c of it via the deciding unit 6.

The reception-marker generating unit 8c having received the notification indicates the reception-marker designated by ● showing the start of idling on the time base of the cell 22 within the time zone between the idling and the registration as shown in FIG. 3B.

(4) Moreover, the mobile communication terminal 1 carries out the registration of the position with the reception measurement unit 4 serving as a system simulator.

Figure 3C:
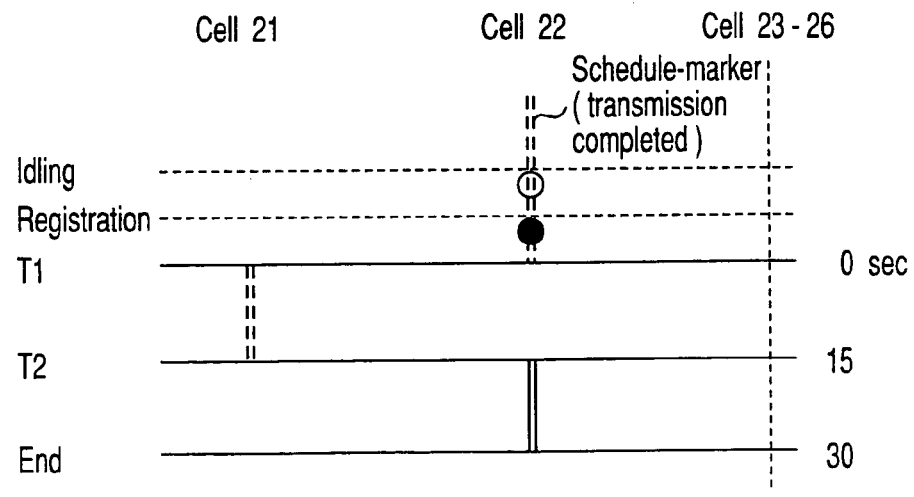

The reception-marker generating unit 8c having received the result of the registration of the position of the mobile communication terminal 1 from the reception measurement unit 4 indicates, on the indication screen of the indicating unit 7, as shown in FIG. 3C, the reception-marker designated by ● showing the meaning that the registration has succeeded currently on the time base between the registration From the indication of FIG. 3A, the operator can understand that it is scheduled to receive the signal corresponding to the cell 22 up to T1, and to receive the signal corresponding to the cell 21 from T1 to T2, and to receive the signal corresponding to the cell 22 again thereafter.

(2) The transmitting/receiving unit 3 transmits the signal corresponding to the cell 22 so as to have a strength stronger than that of the signals corresponding to the other cells (other transmitter/receivers 3a, 3c, 3d, . . . ) to the mobile communication terminal 1 by using the transmitting/receiving unit 3b thereamong in accordance with an instruction from the test procedure control unit 5.

Note that the mobile communication terminal 1 is designed so as to receive a signal having the strongest strength (level, power) among the signals from the transmitting/receiving unit 3.

The schedule-marker generating unit 8b having received the information showing the state of the output of the transmitter/receiver 3b from the test procedure control unit 5 varies the initial schedule-marker of the solid line which has been indicated on the indication screen of the indicating unit 7 to the schedule-marker of the dotted line showing a state in which the transmitter/receiver 3b is transmitting as and T1.

Note that, the reception-marker designated by ○ of FIG. 3C was the reception-marker designated by ● in FIG. 3B shows that idling was already completed successfully at the time of indication of the reception-marker designated by ○.

Up to now, the deciding unit 6 does not carry out any deciding operation on the result itself of the transition test of the connection state of the mobile communication terminal 1.

Then, as shown in FIG. 3C, because the strength of the signal which corresponds to the cell 21 and which is from the transmitter/receiver 3a is stronger than the strength of transmission of the transmitter/receiver 3b (and other transmitter/receivers), on the indication screen of the indicating unit 7, the schedule-marker of the solid line up to that time is varied to the schedule-marker of the dotted line (during transmission) and the schedule-marker is indicated by the schedule-marker generating unit 8b.

In accordance therewith, the operator can understand that the mobile communication terminal 1 is in a state in which the signal corresponding to the cell 21 is received from the transmitter/receiver 3a, and the connection state is going to be switched from the cell 22 to the cell 21.

(5) The transmitting/receiving unit 3 outputs the result of detecting that the mobile communication terminal 1 carried out the transition of the connection state from the cell 22 to the cell 21, to the reception measurement unit 4.

Then, the reception measurement unit 4 measures a time in which the mobile communication terminal 1 transits the connection state from the cell 22 to the cell 21, and outputs the measured result to the deciding unit 6.

Further, when the deciding unit 6 having received the measured result decides that the mobile communication terminal 1 carried out the transition of the connection state from the cell 22 to the cell 21 within 15 seconds from T1 to T2 with reference to the time information from the time setting unit 5a, the deciding unit 6 instructs the reception-marker generating unit 8c to indicate the reception-marker designated by ● (not shown) on the indication screen of the indicating unit 7.

In addition, when the result from the reception measurement unit 4 arrives after 15 seconds, the deciding unit 6 instructs the reception-marker generating unit 8c to indicate the reception-marker designated by X (not shown) on the indication screen of the indicating unit 7.

Note that, when the reception-marker designated by X is indicated, the deciding unit 6 may be configured so as to be able to cancel the test, and to examine the cause in the mobile communication terminal 1.

(6) The test operations as described above are carried out up to the time when predetermined times of the operations are completed.

Namely, the test operations from the idling start to the time when one test is completed are repeated 1000 times.

Naturally, even if the mobile communication terminal 1 fails in the transition of the connection state on the way of the test, the test may be continued.

EXAMPLE 2

In Example 2, not only the test of the transition of the connection state of the mobile communication terminal 1 according to Example 1, but also the test of the transition of the state of calling including exchanges of messages between the mobile communication terminal 1 and the system simulators 11, 12, 13, . . . is added.

Example 2 is an example as well in which, in addition to the test result of the transition among the cells, the test result of the transition of the operational state of the same cells is indicated.

Next, the flow of the concrete test operations of the test system for the mobile communication terminal according to Example 2 of the invention will be described with reference to FIGS. 1, 4 and 5.

Figure 4:
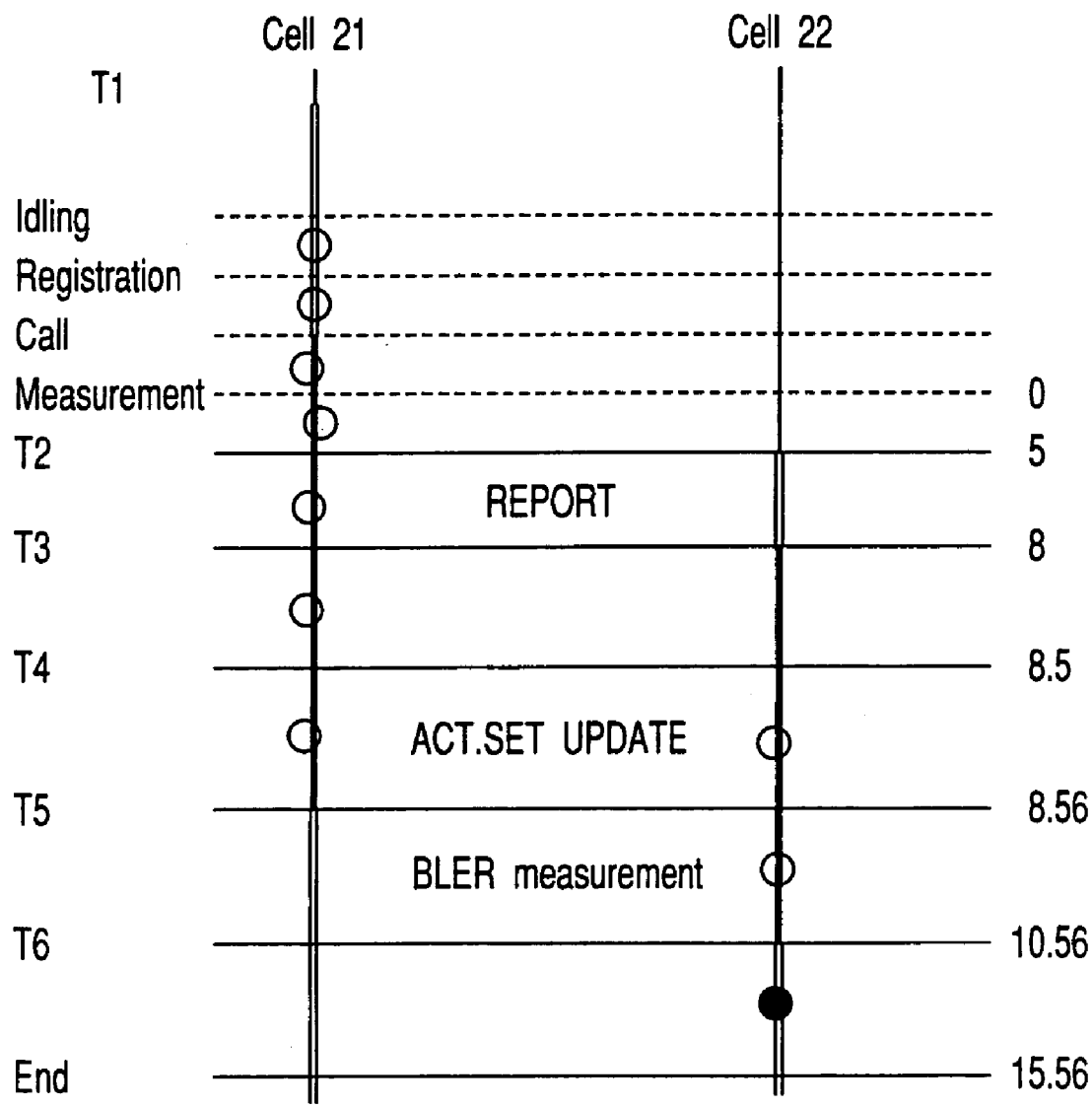
FIG. 4 is a diagram for explanation of an example of a transition of a connection state and a receiving state of the mobile communication terminal 1 to which the test system for the mobile communication terminal of FIG. 1 is applied.
Figure 5:
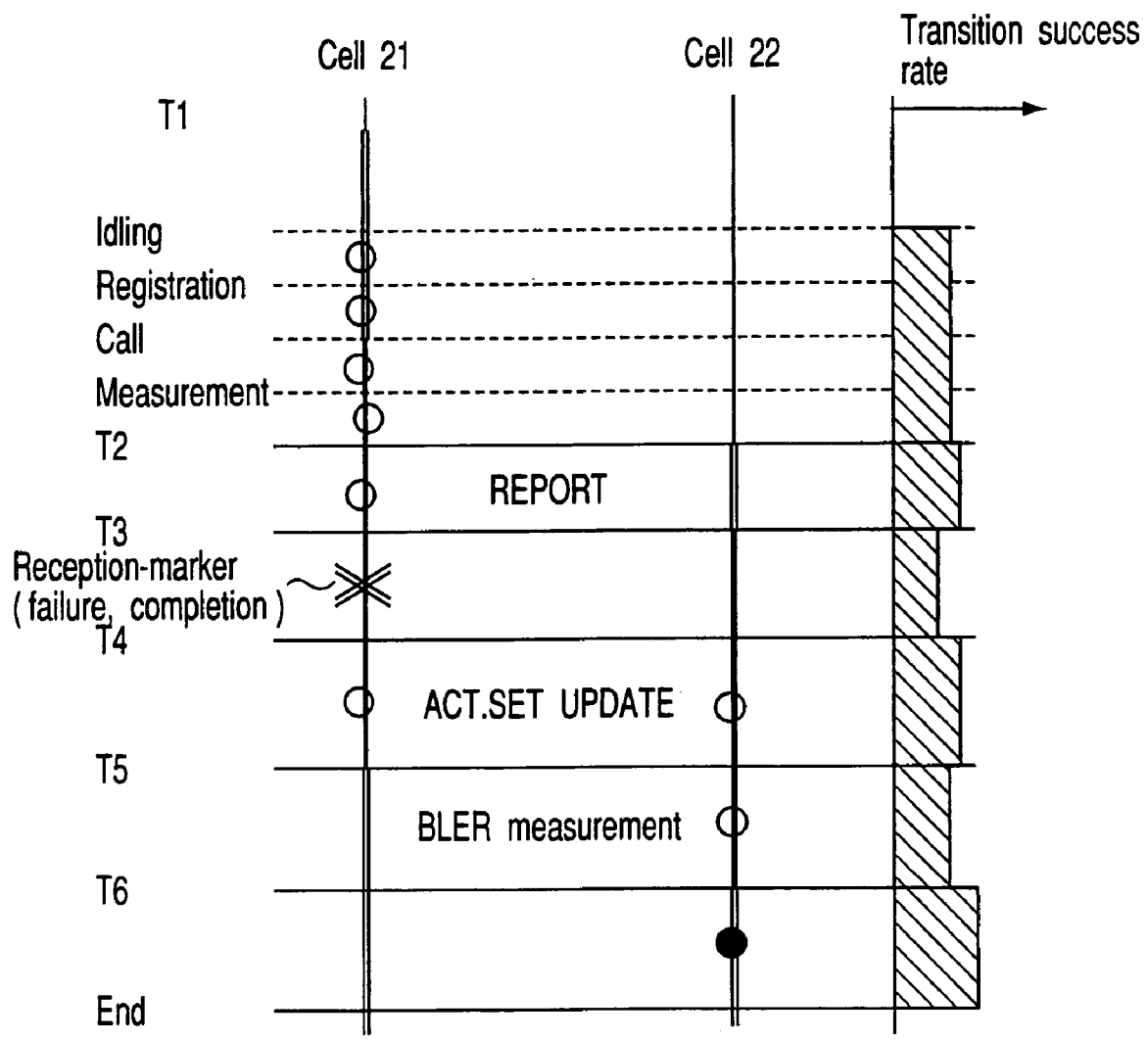
FIG. 5 is a diagram for explanation of another example of a transition of a connection state, among the cells, of the mobile communication terminal 1 to which the test system for the mobile communication terminal of FIG. 1 is applied.
Figure 6:
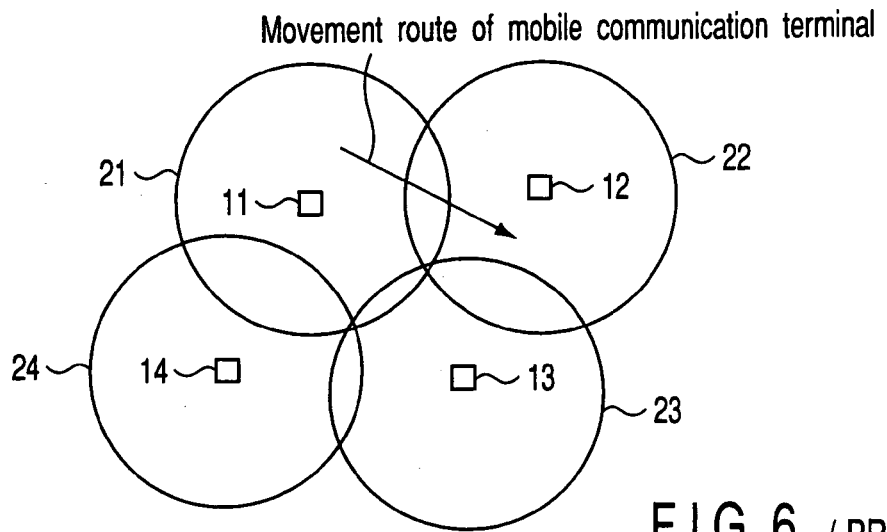
FIG. 6 is a diagram for explanation of the relationship between cells (service areas) and base stations in a cellular system conventionally known.

FIGS. 4 and 5 are diagrams for explanation of examples of the transition tests of the connection state and the reception state of the mobile communication terminal 1 according to Example 2 of the invention to which the test system for the mobile communication terminal of FIG. 1 is applied.

First, as description of the outline of FIGS. 4 and 5, the abscissas indicated on the indication screen of the indicating unit 7 show the cell names, and the ordinates show the scheduled time-passage of the test.

In FIGS. 4 and 5, a state shown by the double line is a state in which only control information is transmitted from the system simulator, and the thick black line shows a state of carrying out calling (both of those are the schedules).

Further, the reception-marker designated by ● shows a success at the current point in time, the reception-marker designated by ○ shows a past success, the reception-marker designated by X shows a failure at the current point in time (not shown), and the X of the outlined double line shows a past failure (not shown).

Now, FIG. 4 shows the state when one test is completed.

(1) The test procedure control unit 5 carries out controls for the respective portions along the procedure which the unit 5 has. However, the time-passage is set by the time setting unit 5a.

(2) First, the coordinate generating unit 8d and the schedule-marker generating unit 8b indicate a state in which there are no reception-markers of FIG. 4 on the indication screen of the indicating unit 7 on the basis of the information from the time setting unit 5a.

Further, the transmitter/receiver 3a starts to transmit the signal (signal corresponding to the cell 21) from T1 at a predetermined strength (level), and the transmitter/receiver 3b transmits the signal (signal corresponding to the cell 22) from T2 at a strength (level) which is the same as that of the transmitter/receiver 3a.

(3) The mobile communication terminal 1 receives the signal (signal corresponding to the cell 21) transmitted at the predetermined strength from the transmitter/receiver 3a, and starts idling. Thereafter, the mobile communication terminal 1 successively processes the respective items of registration of a position with the system simulator, "call" setting, and measurement, and transmits the processed results to the transmitting/receiving unit 3.

The transmitting/receiving unit 3 transmits the results of the successive processings by the mobile communication terminal 1 to the reception-marker generating unit 8c of the indication control unit 8 via the reception measurement unit 4.

Then, the reception-marker generating unit 8c generates the reception-marker designated by ●, and indicates the reception-marker designated by ● on the indication screen of the indicating unit 7 at the time when the mobile communication terminal 1 processed (in practice, because FIG. 4 shows the indicate the state at the time of completion, the marker is the reception-marker designated by ○ (hereinafter, in the same way in this case).

(4) At T2, the system simulator requests the message "REPORT" on whether or not the mobile communication terminal 1 has recognized the signal (signal corresponding to the cell 22) transmitted from the transmitter/receiver 3b, of the mobile communication terminal 1 via the transmitter/receiver 3a, and the transmitting/receiving unit 3 receives the REPORT in response thereto from the mobile communication terminal 1, and transmits the received result to the deciding unit 6.

The deciding unit 6 decides whether the mobile communication terminal 1 reported or not between T2 and T3 (for three seconds), and whether the content of the REPORT is "recognition" or not. When the decision is OK, the reception-marker designated by ● is indicated on the indication screen of the indicating unit 7 by the reception-marker generating unit 8c. If any of the both conditions is not satisfied, the reception-marker designated by X is indicated.

(5) The mobile communication terminal 1 switches to a state of capable of calling with both of the transmitter/receivers 3a and 3b between T3 and T4.

The deciding unit 6 receives the state of switching of the mobile communication terminal 1 from the transmitting/receiving unit 3, and decides whether or not the switching time is completed between T3 and T4 (within 0.5 seconds), and transmits the decided result to the reception-marker generating unit 8c.

In accordance therewith, the reception-marker generating unit 8c indicates the reception-marker designated by ● or the reception-marker designated by X on the indication screen of the indicating unit 7 in the same way as described above.

As one example thereof, FIG. 5 shows an example in which the reception-marker designated by the outlined X between T3 and T4.

(6) The test procedure control unit 5 causes the transmitter/receivers 3a and 3b to transmit a confirmatory message whether or not it is in a state of calling with the transmitter/receiver 3a and the transmitter/receiver 3b (a system simulator 11 and a system simulator 12) to the mobile communication terminal 1.

On the other hand, the deciding unit 6 having received the message "ACT. SET UPDATE" (Active Set Update) from the mobile communication terminal 1 via the transmitting/ receiving unit 3 decides as a success provided that the response time is within T4 to T5 (0.06 seconds) and a message is "the state of calling", and nor, the deciding unit 6 decides as a failure.

This decided result by the deciding unit 6 is indicated on the indication screen of the indicating unit 7 by the reception-marker generating unit 8c.

(7) Between T5 and T6, the strength of the transmission signal of the transmitter/receiver 3a is made to deteriorate. As a result, the mobile communication terminal 1 switches the connection state from the state of receiving the signals of both of the transmitter/receiver 3a and the transmitter/receiver 3b to the state of receiving only the signal of the transmitter/receiver 3b, the transmitting/receiving unit 3 receives the signal from the mobile communication terminal 1, and an error rate of the message is measured by BLER measurement (Block Error Rate measurement) at the deciding unit 6.

The deciding unit 6 decides whether or not the time of switching and the error rate are less than or equal to a specified values (normal), indicates the reception-marker designated by ● or the reception-marker designated by X on the indication screen of the indicating unit 7 via the reception-marker generating unit 8b, and completes the test.

(8) In order to statistically determine the test results, for example, the test from T1 to the end as described above are repeated 1000 times.

Note that, in FIG. 5, as shown as the transition success rate at the right hand end on the indication screen of the indicating unit 7, a probability (or a frequency) of successes (or failures) for each time interval can be indicated.

This can be achieved by indicating, at the right hand end on the indication screen of the indicating unit 7, by the coordinate generating unit 8d, the transition success rate for each time interval which can be obtained due to the statistical processing unit 9 carrying out statistical processing by counting the decided result of the deciding unit 6, and there is the advantage that the operator can understand which process an error easily arises at, at a glance.

Note that, in FIG. 5, during the time when a message is being decided, the transition success rate at the right hand end on the indication screen of the indicating unit 7 is a rate including the decision on the contents.

Further, between T5 and T6, the result of, not the transition success rate, but measurement of the error rate may be indicated.

Note that, with respect to the success rate, a success rate at that time with respect to the all number of times of the tests is calculated, and for example, when the total number of times are 1000 times, provided that the success rate is achieved at the time of 900 times, it is decided as a success, and at that point in time, an instruction for canceling the test may be ordered.

Note that FIG. 5 shows the state of indication at the current point in time when 98 times of tests among 1000 times which is the scheduled number of times of the tests are completed.

As described above, according to the present invention, in the system simulator test of the mobile communication terminal 1, it is configured that the schedule-marker generating units and the coordinate generating unit of the indication control unit indicate the schedule of the connection-transition among the cells of the mobile communication terminal 1 so as to be visually recognizable within a time-passage, and by receiving the results decided by the deciding unit as a success or a failure of the transition in an actual test, the reception-marker generating unit indicates within the scheduled time-passage. Accordingly, there can be obtained the advantage that, in the connection test by the system simulator, the operator can visually recognize to which cell the connection state has been transited at what time-passage, and whether the transition is a success or a failure, and can visually recognize the state of progress of the test.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A test system for a mobile communication terminal, comprising:
   a test procedure control unit which possesses a procedure for carrying out a transition test of a connection state of a mobile communication terminal of a cellular system, and outputs control information including time setting information along the procedure;
   a transmitting/receiving unit which, in accordance with the control information from the test procedure control unit, generates a plurality of test signals corresponding to a plurality of cells in the cellular system, varies said plurality of test signals so as to be successively stronger in accordance with a scheduled time-passage and transmits the signals toward the mobile communication terminal, and receives a response signal from the mobile communication terminal;
   a reception measurement unit which measures a transition time of the connection state among the cells of the mobile communication terminal, the transition time being a time when the mobile communication terminal switches from a state of receiving one test signal among said plurality of test signals to a state of receiving another test signal, in accordance with the response signal from the mobile communication terminal;
   a deciding unit which receives a measured result of the transition time from the reception measurement unit, and decides whether or not the connection state of the mobile communication terminal is transiting among said plurality of cells in the cellular system in accordance with the scheduled time-passage;
   an indicating unit which indicates results of the transition test of the connection state of the mobile communication terminal; and
   an indication control unit which receives the decided result of the connection state from the deciding unit and the measured result of the transition time from the reception measurement unit, and causes the indicating unit to indicate, as a result of the transition test of the connection state of the mobile communication terminal, the decided result of the connection state and the transition among the cells of the connection state of the mobile communication terminal corresponding to the time-passage, so as to be visually recognizable on a single coordinate.

2. The test system for a mobile communication terminal according to claim 1, wherein the test system for a mobile communication terminal further comprises:
   a statistical processing unit which determines a transition success rate showing establishment of successes in the transitions among the cells of the connection state of the mobile communication terminal for each time interval corresponding to the time-passage on the basis of the decided result of the connection state from the deciding unit, and the indication control unit indicates the transition success rate showing the establishment of successes in transitions among the cells of the connection state of the mobile communication terminal for each time interval corresponding to the time-passage determined by the statistical processing unit, so as to be visually recognizable on the single coordinate.

3. The test system for a mobile communication terminal according to claim 2, wherein the test procedure control unit has a computer and computer readable program code means for causing the computer to carry out a transition test of a connection state of a mobile communication terminal of a cellular system, and outputs control information including time setting information along the computer readable program code means, the statistical processing unit is constructed as a software of the computer together with the deciding unit, the indication control unit, and the test procedure control unit, and the computer readable program code means comprises:

first computer readable program code means for causing the transmitting/receiving unit to generate a plurality of test signals corresponding to a plurality of cells in the cellular system in accordance with the control information from the test procedure control unit, to vary said plurality of test signals so as to be successively stronger in accordance with a scheduled time-passage and transmit the signals toward the mobile communication terminal, and to receive a response signal from the mobile communication terminal;

second computer readable program code means for causing the reception measurement unit to measure a transition time of the connection state among the cells of the mobile communication terminal, the transition time being a time when the mobile communication terminal switches from a state of receiving one test signal among the plurality of test signals to a state of receiving another test signal, in accordance with the response signal from the mobile communication terminal;

third computer readable program code means for causing the deciding unit to receive a measured result of the transition time from the reception measurement unit, and to decide whether or not the connection state of the mobile communication terminal is transiting among said plurality of cells in the cellular system in accordance with the predetermined time-passage;

fourth computer readable program code means for causing the indication control unit to receive the decided result of the connection state from the deciding unit and receive the measured result of the transition time from the reception measurement unit, and to control for causing the indicating unit to indicate, as a result of the transition test of the connection state of the mobile communication terminal, the decided result of the connection state and the transition among the cells of the connection state of the mobile communication terminal corresponding to the time-passage, so as to be visually recognizable on a single coordinate;

fifth computer readable program code means for causing the statistical processing unit to determine a transition success rate showing establishment of successes in transitions among the cells of the connection state of the mobile communication terminal for each time interval corresponding to the time-passage on the basis of the decided result of the connection state from the deciding unit; and sixth computer readable program code means for causing the indication control unit to carry out controls for indicating the transition success rate showing the establishment of successes in transitions among the cells of the connection state of the mobile communication terminal for each time interval corresponding to the time-passage determined by the statistical processing unit, so as to be visually recognizable on the single coordinate.

4. The test system for a mobile communication terminal according to claim 1, wherein the indication control unit includes a coordinate generating unit which generates, as the single coordinate, a coordinate showing the time-passage corresponding to at least two cells, and indicates the coordinate on the indicating unit.

5. The test system for a mobile communication terminal according to claim 4, wherein the indication control unit includes a schedule-marker generating unit which generates a schedule-marker showing a schedule of transition among the cells of the connection state of the mobile communication terminal according to the scheduled time-passage, and indicates the schedule-marker in advance on the coordinate that shows the time-passage and that is displayed by the coordinate generating unit, in accordance with time setting information from the test procedure control unit.

6. The test system for a mobile communication terminal according to claim 5, wherein the indication control unit includes a reception-marker generating unit which receives a decided result of the connection state from the deciding unit, generates a reception-marker showing the decided result that is obtained at every time when the connection state transits in accordance with the time-passage, and indicates the reception-marker, together with the schedule-marker generated by the schedule-marker generating unit, on the coordinate that shows the time-passage and that is displayed by the coordinate generating unit; and an indicating position of the reception-marker shows a current time.

7. The test system for a mobile communication terminal according to claim 6, wherein the schedule-marker generated by the schedule-marker generating unit is varied so as to be recognizable from the initial schedule marker in accordance with progress of the transition among the cells of the connection state of the mobile communication terminal.

8. The test system for a mobile communication terminal according to claim 6, wherein the reception-marker generated by the reception-marker generating unit includes a reception-marker relating to decided results of idling and registration of the mobile communication terminal which are carried out prior to the transition among the cells of the connection state of the mobile communication terminal.

9. The test system for a mobile communication terminal according to claim 8, wherein the reception-markers generated by the reception-marker generating unit are varied such that a reception-marker showing the decided result in the past and a reception-marker showing the decided result at present can be recognized from one another.

10. The test system for a mobile communication terminal according to claim 1, wherein the test procedure control unit has a computer and computer readable program code means for causing the computer to carry out a transition test of a connection state of a mobile communication terminal of a cellular system, and outputs control information including time setting information along the computer readable program code means.

11. The test system for a mobile communication terminal according to claim 10, wherein the deciding unit and the indication control unit are constructed as software of the computer together with the test procedure control unit.

12. The test system for a mobile communication terminal according to claim 11, wherein the computer readable program code means comprises:

first computer readable program code means for, in accordance with the control information from the test procedure control unit, causing the transmitting/receiving unit to generate a plurality of test signals corresponding to a plurality of cells in the cellular system, to vary said plurality of test signals so as to be successively stronger in accordance with a scheduled time-passage and transmit the signals toward the mobile communication terminal, and to receive a response signal from the mobile communication terminal;

second computer readable program code means for causing the reception measurement unit to measure a transition time of the connection state among the cells of the mobile communication terminal, the transition time being a time when the mobile communication terminal switches from a state of receiving one test signal among the plurality of test signals to a state of receiving another test signal, in accordance with the response signal from the mobile communication terminal;

third computer readable program code means for causing the deciding unit to receive a measured result of the transition time from the reception measurement unit, and to decide whether or not the connection state of the mobile communication terminal is transiting among said plurality of cells in the cellular system in accordance with the predetermined time-passage; and fourth computer readable program code means for causing the indication control unit to receive a decided result of the connection state from the deciding unit and the measured result of the transition time from the reception measurement unit, and to control for causing the indicating unit to indicate, as a result of the transition test of the connection state of the mobile communication terminal, the decided result of the connection state and the transition among the cells of the connection state of the mobile communication terminal corresponding to the time-passage, so as to be visually recognizable on a single coordinate.

13. A method for testing a mobile communication terminal, comprising:

preparing a test procedure control unit which possesses a procedure for carrying out a transition test of a connection state of a mobile communication terminal of a cellular system, and outputs control information including time setting information along the procedure;

in accordance with the control information from the test procedure control unit, generating a plurality of test signals corresponding to a plurality of cells in the cellular system, varying said plurality of test signals so as to be successively stronger in accordance with a scheduled time-passage and transmitting the signals toward the mobile communication terminal, and receiving a response signal from the mobile communication terminal;

measuring a transition time of the connection state among the cells of the mobile communication terminal, the transition time being a time when the mobile communication terminal switches from a state of receiving one test signal among the plurality of test signals to a state of receiving another test signal, in accordance with the response signal from the mobile communication terminal;

receiving a measured result of the transition time, and deciding whether or not the connection state of the mobile communication terminal is transiting among said plurality of cells in the cellular system in accordance with the scheduled time-passage; and receiving the decided result of the connection state and the measured result of the transition time, and causing the indicating unit to indicate, as a result of the transition test of the connection state of the mobile communication terminal, the decided result of the connection state and the transition among the cells of the connection state of the mobile communication terminal corresponding to the time-passage, so as to be visually recognizable on a single coordinate.

14. The method for testing a mobile communication terminal according to claim 13, wherein the method for testing a mobile communication terminal further comprises:

determining a transition success rate showing establishment of successes in the transitions among the cells of the connection state of the mobile communication terminal for each time interval corresponding to the time-passage on the basis of the decided result of the connection state; and indicating the transition success rate showing the establishment of successes in transitions among the cells of the connection state of the mobile communication terminal for each time interval corresponding to the time-passage, so as to be visually recognizable on the single coordinate.

15. A test system for a mobile communication terminal, comprising:

test procedure control means for possessing a procedure for carrying out a transition test of a connection state of a mobile communication terminal of a cellular system, and outputting control information including time setting information along the procedure;

transmitting/receiving means for, in accordance with the control information from the test procedure control means, generating a plurality of test signals corresponding to a plurality of cells in the cellular system, varying said plurality of test signals so as to be successively stronger in accordance with a scheduled time-passage and transmitting the signals toward the mobile communication terminal, and receiving a response signal from the mobile communication terminal;

reception measurement means for measuring a transition time of the connection state among the cells of the mobile communication terminal, the transition time being a time when the mobile communication terminal switches from a state of receiving one test signal among said plurality of test signals to a state of receiving another test signal, in accordance with the response signal from the mobile communication terminal;

deciding means for receiving a measured result of the transition time from the reception measurement means, and deciding whether or not the connection state of the mobile communication terminal is transiting among said plurality of cells in the cellular system in accordance with the scheduled time-passage;

indicating means for indicating the result of the transition test of the connection state of the mobile communication terminal; and indication control means for receiving the decided result of the connection state from the deciding means and the measured result of the transition time from the reception measurement means, and causing the indicating means indicate, as results of the transition test of the connection state of the mobile communication terminal, the decided result of the connection state and the transition among the cells of the connection state of the mobile communication terminal corresponding to the time-passage, so as to be visually recognizable on a single coordinate.

16. The test system for a mobile communication terminal according to claim 15, wherein the test system for a mobile communication terminal further comprises:

statistical processing means for determining a transition success rate showing establishment of successes in the transitions among the cells of the connection state of the mobile communication terminal for each time interval corresponding to the time-passage on the basis of the decided result of the connection state from the deciding means, and the indication control means indicates the transition success rate showing the establishment of successes in transitions among the cells of the connection state of the mobile communication terminal for each time interval corresponding to the time-passage determined by the statistical processing means, so as to be visually recognizable on the single coordinate.

17. The test system for a mobile communication terminal according to claim 16, wherein the test procedure control means has a computer and computer readable program code means for causing the computer to carry out a transition test of a connection state of a mobile communication terminal of a cellular system, and outputs control information including time setting information along the computer readable program code means, the statistical processing means is constructed as a software of the computer together with the deciding means, the indication control means, and the test procedure control means, and the computer readable program code means comprises:

first computer readable program code means for, in accordance with the control information from the test procedure control means, causing the transmitting/receiving means to generate a plurality of test signals corresponding to a plurality of cells in the cellular system, to vary said plurality of test signals so as to be successively stronger in accordance with a scheduled time-passage and transmit the signals toward the mobile communication terminal, and to receive a response signal from the mobile communication terminal;

second computer readable program code means for causing the reception measurement means to measure a transition time of the connection state among the cells of the mobile communication terminal, the transition time being a time when the mobile communication terminal switches from a state of receiving one test signal among said plurality of test signals to a state of receiving another test signal, in accordance with the response signal from the mobile communication terminal;

third computer readable program code means for causing the deciding means to receive a measured result of the transition time from the reception measurement means, and to decide whether or not the connection state of the mobile communication terminal is transiting among said plurality of cells in the cellular system in accordance with the predetermined time-passage;

fourth computer readable program code means for causing the indication control means to receive the decided result of the connection state from the deciding means and the measured result of the transition time from the reception measurement means, and to control for causing the indicating means to indicate, as results of the transition test of the connection state of the mobile communication terminal, the decided result of the connection state and the transition among the cells of the connection state of the mobile communication terminal corresponding to the time-passage, so as to be visually recognizable on a single coordinate;

fifth computer readable program code means for causing the statistical processing means to determine a transition success rate showing establishment of successes in transitions among the cells of the connection state of the mobile communication terminal for each time interval corresponding to the time-passage on the basis of the decided result of the connection state from the deciding means; and sixth computer readable program code means for causing the indication control means to control for indicating the transition success rate showing the establishment of successes in transitions among the cells of the connection state of the mobile communication terminal for each time interval corresponding to the time-passage determined by the statistical processing means, so as to be visually recognizable on the single coordinate.

18. The test system for a mobile communication terminal according to claim 15, wherein the indication control means includes coordinate generating means for generating, as the single coordinate, a coordinate showing the time-passage corresponding to at least two cells, and indicating the coordinate on the indicating means.

19. The test system for a mobile communication terminal according to claim 18, wherein the indication control means includes schedule-marker generating means for generating a schedule-marker showing a schedule of a transition among the cells of the connection state of the mobile communication terminal according to the scheduled time-passage, and indicating the schedule-marker in advance on the coordinate that shows the time-passage and that is displayed by the coordinate generating means, in accordance with time setting information from the test procedure control means.

20. The test system for a mobile communication terminal according to claim 19, wherein the indication control means includes reception-marker generating means for receiving a decided result of the connection state from the deciding means, generating a reception-marker showing the decided result that is obtained at every time when the connection state transits in accordance with the time-passage, and indicating the reception-marker, together with the schedule-marker generated by the schedule-marker generating means on the coordinate that shows the time-passage and that is displayed by the coordinate generating means; and an indicating position of the reception-marker shows a current time.

21. The test system for a mobile communication terminal according to claim 20, wherein the schedule-marker generated by the schedule-marker generating means is varied so as to be recognizable from the initial schedule marker in accordance with progress of the transition among the cells of the connection state of the mobile communication terminal.

22. The test system for a mobile communication terminal according to claim 20, wherein the reception-marker generated by the reception-marker generating means includes a reception-marker relating to decided results of idling and registration of the mobile communication terminal which are carried out prior to the transition among the cells of the connection state of the mobile communication terminal.

23. The test system for a mobile communication terminal according to claim 22, wherein the reception-markers generated by the reception-marker generating means are varied such that a reception-marker showing the decided result in the past and a reception-marker showing the decided result at present can be recognized from one another.

24. The test system for a mobile communication terminal according to claim 15, wherein the test procedure control means has a computer and computer readable program code means for causing the computer to carry out a transition test of a connection state of a mobile communication terminal of a cellular system, and outputs control information including time setting information along the computer readable program code means.

25. The test system for a mobile communication terminal according to claim 24, wherein the deciding means and the indication control means are constructed as software of the computer together with the test procedure control means.

26. The test system for a mobile communication terminal according to claim 25, wherein the computer readable program code means comprises:

first computer readable program code means for, in accordance with the control information from the test procedure control means, causing the transmitting/receiving means to generate a plurality of test signals corresponding to a plurality of cells in the cellular system, to vary said plurality of test signals so as to be successively stronger in accordance with a scheduled time-passage and transmit the signals toward the mobile communication terminal, and to receive a response signal from the mobile communication terminal;

second computer readable program code means for causing the reception measurement means to measure a transition time of the connection state among the cells of the mobile communication terminal, the transition time being a time when the mobile communication terminal switches from a state of receiving one test signal among said plurality of test signals to a state of receiving another test signal, in accordance with the response signal from the mobile communication terminal;

third computer readable program code means for causing the deciding means to receive a measured result of the transition time from the reception measurement means, and to decide whether or not the connection state of the mobile communication terminal is transiting among said plurality of cells in the cellular system in accordance with the predetermined time-passage; and fourth computer readable program code means for causing the indication control means to receive the decided result of the connection state from the deciding means and the measured result of the transition time from the reception measurement means, and to control for causing the indicating means to indicate, as results of the transition test of the connection state of the mobile communication terminal, the decided result of the connection state and the transition among the cells of the connection state of the mobile communication terminal corresponding to the time-passage, so as to be visually recognizable on a single coordinate.

* * * * *

UNITED STATES PATENT AND TRADEMARK OFFICE
CERTIFICATE OF CORRECTION

PATENT NO. : 7,215,951 B2
APPLICATION NO. : 10/802680
DATED : May 8, 2007
INVENTOR(S) : Hideki Tanaka et al.

Page 1 of 1

It is certified that error appears in the above-identified patent and that said Letters Patent is hereby corrected as shown below:

On the Title Page:

Item (*) Notice:

After line 3, insert:

-- This patent is subject to a terminal disclaimer--.

Signed and Sealed this

Twentieth Day of November, 2007

JON W. DUDAS
*Director of the United States Patent and Trademark Office*